Dec. 25, 1962 E. O. BOTTOLFSON 3,070,262
GRAIN AUGER HOPPER
Filed May 18, 1959
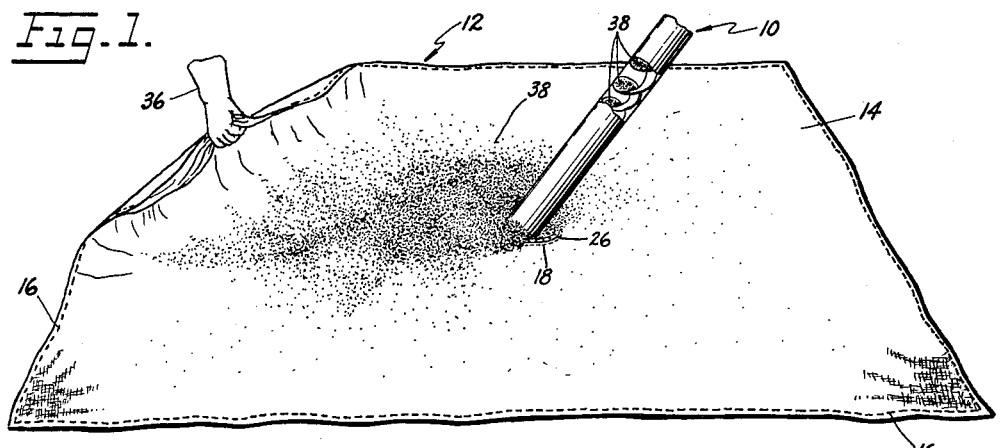
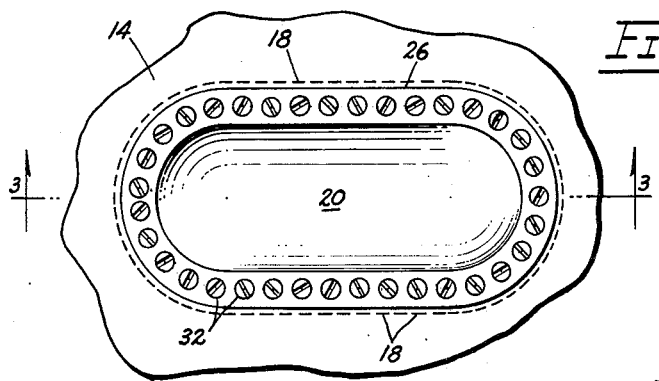
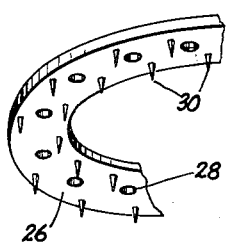
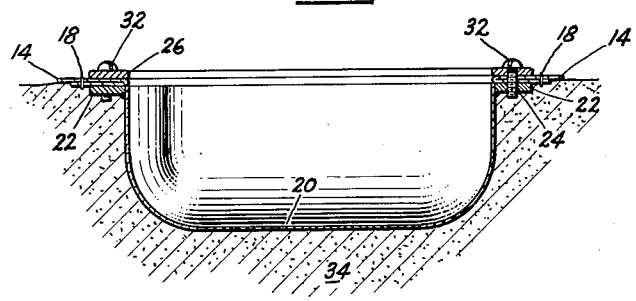
INVENTOR.
EDWIN O. BOTTOLFSON
BY
Stuart R. Peterson
ATTORNEY

United States Patent Office 3,070,262
Patented Dec. 25, 1962

3,070,262
GRAIN AUGER HOPPER
Edwin O. Bottolfson, Devils Lake, N. Dak.
Filed May 18, 1959, Ser. No. 814,116
12 Claims. (Cl. 222—107)

This invention relates generally to grain hoppers, and pertains more particularly to a hopper having especial utility when used in conjunction with an auger type grain elevator.

One important object of the present invention is to provide a hopper having a construction which easily permits the removal of all the grain from the hopper without resort to shovels or other implements, it only being necessary to pick up one or more corners of a flexible sheet included as a part of my hopper so as to cause the grain to gravitate to a vantage point immediately beneath the inlet end of the grain auger from where it can be readily elevated by the auger.

Another object of the invention is to facilitate the dumping of the grain from the truck, it being only necessary to back the truck toward the hopper at any convenient angle not interfering with the grain auger. More specifically, it is an aim of the invention to permit the truck to approach the hopper from various angles, angles that require no precise alignment of the truck relative to the hopper, thereby allowing a more rapid dumping of the grain and at the same time avoiding spillage of the grain onto the adjacent ground. Actually, one has in the neighborhood of 180° freedom of operation around the front of the auger when employing a hopper having a construction in accordance with the teachings of this invention.

A further object of the invention is to provide a hopper having a flexible construction so that the lower end of the auger can be quickly covered up at the end of a day's operation, thereby keeping out rain which may fall during the night, or for that matter anytime during the day when operations have to be quickly terminated because of inclement weather. With a hopper of the envisaged type, the grain remaining in the hopper will always remain dry so that it will be in condition to be elevated when augering operations are resumed.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

FIGURE 1 is a perspective view of my grain hopper in actual use, a portion of the auger being shown which removes the grain from the hopper;

FIGURE 2 is a fragmentary plan view looking directly down into the cup of receptacle centrally located with respect to the flexible sheet, only those portions of the flexible sheet immediately surrounding the cup having been illustrated in this view;

FIGURE 3 is a sectional view taken in the direction of line 3—3 of FIGURE 2, and FIGURE 4 is a fragmentary perspective view of a collar utilized in anchoring the flexible material to the cup from which the grain is withdrawn by the auger.

Referring now in detail to the various views constituting the drawing, it is to be observed that the lower portion of a conventional grain auger denoted generally by the reference numeral 10 has been depicted in FIGURE 1. Such augers are quite conventional and need not be described in detail other than to say that this is the means customarily used on farms and the like for elevating grain into a storage bin or similar receptacle.

The grain hopper exemplifying my invention has been indicated generally by the reference numeral 12. This hopper includes an apron 14 of flexible sheet material, such as canvas. It will be seen from FIGURE 1 that the outer edge is seamed at 16; also, there is an inner seam 18 which will presently be described with greater particularity. The dimensions of the apron 14 are not important to a practicing of the invention, but it can be pointed out that such dimensions may typically be 10 by 12 feet.

The central portion of the apron 14 is formed with an opening of a size so as to accommodate a metal cup 20. Here again, dimensions are not critical, but suggestively the cup can be approximately 8 by 18 inches. Actually, as will be better understood as the description progresses, the cup is of oblong configuration, this configuration being clearly apparent from FIGURE 2. A peripheral flange 22 extends laterally from the upper edge of the cup 20. This flange may be formed in a variety of ways, but in the present instance it may be considered as having been originally formed as a separate member and then brazed or otherwise secured to the upper edge or rim of the cup 20. As best viewed at the right of FIGURE 3, the flange 22 is formed with a series of tapped holes 24. Any preferred number of such holes can be spaced throughout the elliptical length of the flange 22.

Next to be described is an oblong or oval collar labeled 26. This collar 26 is provided with a series of drilled holes 28 equal in number to the holes 24 and similarly spaced so as to be registrable therewith. From FIGURE 4 it can be discerned that the collar 26 is provided with a plurality of downwardly projecting teeth 30, the function of these teeth 30 being to firmly engage or grip the canvas sandwiched between the collar 26 and the flange 22. Extending downwardly through the collar 26, the canvas 14, and the flange 22 is a plurality of bolts 32. The role played by these bolts 32 is believed readily apparent, it being to retain the collar 26 in a fixed relation with respect to the flange 22 and at the same time maintain registry of the opening in the apron 14 with the open upper end of the cup 20.

Having mentioned previously the use of the seam 18, it will be appreciated that this stitching is used for reinforcing purposes, it being contemplated that the apron 14 be reversely folded on itself in forming the marginal portion thereof that is to overlie the flange 22. Although not shown, it will be recognized that suitable slits in the material constituting the apron 14 may be angularly directed so as to permit the reverse folding clearly illustrated in FIGURE 3. Whether the reverse folding is employed depends largely upon the thickness and type of material used as the apron 14.

FIGURE 3 clearly shows that the cup 20 is provided with a closed bottom. Also, this figure shows that it is intended that the cup 20 be recessed into the ground, the ground having been denoted by the reference numeral 34. By so doing, the upper end of the cup 20 is approximately flush with the upper surface of the ground 34.

The manner of using my grain hopper 12 is believed to be readily apparent from the foregoing information. However, a brief outline as to the steps involved may be of some assistance in fully appreciating all of the benefits that are derivable from a practicing of the invention. Once the site has been selected for the placement of my hopper 12, a hole is dug for the receptive accommodation of the cup 20. The cup 20 is then of course placed into the hole so that it assumes a position similar to that depicted in FIGURE 3. When so positioned, the apron 14 extends laterally from the cup 20 in all directions.

Having so positioned the cup 20 and its attached apron 14, the auger 10 can then be juxtaposed so that its lower or inlet end extends downwardly into the cup 20. It has already been pointed out that the cup 20 is of oval or oblong configuration. The reason for this will now be manifest, it is believed, for it permits the auger 10 to assume various inclinations, even to the extent of providing a rather small or acute angle with respect to the general plane of which the apron 14 is residing. Consequently, the cup 20 will normally be oriented so that its maximum dimension, that is, its length, will extend in the same general direction as does the auger 10.

With the apron 14 spread upon the ground in substantially the manner in which it appears in FIGURE 1, the truck containing the grain to be dumped can be backed into position. It is believed obvious that the particular angle of approach of the truck is governed only by the interference provided by the auger 10. Hence, the dumping of the grain can be facilitated by not having to exercise any degree of care as far as the backing up of the truck is concerned.

To show the versatility of the invention, a person's hand 36 has been illustrated in FIGURE 1. It will be discerned that any small amount of grain, such as that labeled 38, can be caused to gravitate in the direction of the cup 20 by merely lifting one or more corners of the flexible apron 14. By reason of this convenience, no shoveling of the grain is needed so as to bring the residual grain to the inlet or entrance end of the auger 10. Owing to the flexibility of the apron 14, it will also be noted that the corners thereof can be overlapped or wrapped about the lower end of the auger 10, thereby protecting any of the residual grain 38 that might remain. In this way, the grain 38 is protected from the weather and will remain dry during a rain storm. My invention, therefore, possesses a number of advantages over prior art hoppers where a rigid, box-like hopper is placed upon the ground and which hopper requires considerable care in the dumping of grain thereinto as well as its subsequent withdrawal.

As certain changes could be made in the above construction without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A hopper for a grain elevating auger comprising a central, hollow, cup-shaped portion of sufficient size to accommodate the lower end of a grain auger and terminating in an upper rim defining its open end, said cup-shaped portion forming an unrestricted cavity for the reception of grain and said auger end in use, a flange surrounding said rim and extending laterally outwardly therefrom, said flange lying in the plane of said rim, an outer portion including a flexible apron connected to and freely extending laterally outwardly from and completely around said flange so that it can engage the ground substantially throughout when in use, said apron lying in the general plane of said rim and said apron having a central opening of the same size as, and registering with, said open end of said cup-shaped portion, and means securing said outer portion to said central portion of said flange.

2. A hopper for a grain elevating auger comprising a cup-shaped member of a sufficient size to accommodate the lower end of a grain auger and having a closed bottom end and an open upper end, said cup-shaped member constituting an unrestricted cavity for the reception of only said auger end and a relatively small quantity of grain during use, flange means projecting laterally from the upper end, a flexible apron having an opening therein of the same size, and registering with, the open upper end of said cup-shaped member so as to cause a marginal portion of said apron to overlie said flange means, and means anchoring the overlying marginal portion of said apron to said flange means to support said flexible apron only at said marginal portion.

3. A hopper is accordance with claim 2 in which said cup-shaped member is oblong when viewed from above.

4. A hopper for a grain elevating auger comprising a member having a recessed bottom and an open upper end, said open end being of a size to receive the lower end of a grain auger and having a peripheral flange projecting horizontally therefrom and formed with a series of holes at spaced locations thereabout, said member providing an unrestricted cavity for the reception of only said auger end and a limited amount of grain during use, a sheet of flexible material having an opening therethrough of the same size as said open end so as to provide a marginal sheet portion overlying said peripheral flange, a collar member having a series of holes registrable with said series of holes in said flange, and a plurality of fastening elements extending through the holes of said collar, through said marginal sheet portion and into the holes in said flange for retaining the opening in said sheet material in registry with the open end of said recessed member and to support said sheet only at said marginal portion.

5. A hopper in accordance with claim 4 in which said fastening elements are bolts and said flange holes are tapped for the threaded retention of the lower ends of said bolts.

6. A hopper for a grain elevating auger comprising a cup-shaped member having a recessed bottom and an open upper end, said open end being of a size to receive the lower end of a grain auger and having an integral peripheral flange extending laterally outwardly therefrom and formed with a series of holes at spaced locations thereabout, said cup-shaped member forming an unrestricted void for the reception of only said auger end and a limited amount of grain in use, a sheet of flexible material having an opening therethrough and having marginal portions of said material adjacent said opening reversely folded so as to overlie said flange and to make said opening the same size as the open end of said cup-shaped member, stitching forming a seam anchoring the free edge of said reversely folded marginal portions to the flexible sheet material confronting same, a collar member having a series of holes in said flange, and a plurality of fastening elements extending through the holes of said collar, through said reversely folded marginal portions and the sheet material confronting same, and into the holes in said flange for retaining the opening in said sheet material in registry with the open end of said cup-shaped member and to support said sheet only adjacent said opening.

7. A hopper for a grain elevating auger comprising a member having a recessed bottom and an open upper end, said open end being of a size sufficient to receive the lower end of a grain auger and having a peripheral flange projecting horizontally therefrom and formed with a series of holes at spaced locations thereabout, said member thereby providing an unrestricted void for the reception of only said auger end and a very small quantity of grain when in actual use, a sheet of flexible material having an opening therethrough of the same size as said open end so as to provide a marginal sheet portion overlying said peripheral flange, a collar member having a series of holes registrable with said series of holes in said flange and provided with a plurality of downwardly projecting teeth for engaging said flexible material, and a plurality of fastening elements extending through the holes of said collar, through said marginal sheet portion and into the holes in said flange for retaining the opening in said sheet material in registry with the open end of said recessed member and to attach said sheet only at said marginal portion.

8. In combination with grain elevating means, a hopper comprising a central, hollow, cup-shaped portion terminating in an upper rim defining its open end, a flange surrounding said rim and extending laterally outwardly therefrom, said flange lying in the plane of said rim, an outer portion including a flexible apron connected to and extending laterally outwardly from and completely around said flange, said apron lying in the general plane of said rim and said apron having a central opening of the same size as, and registering with, said open end of said cup-shaped portion, and means securing said outer portion to said central portion of said flange, said elevating means extending into said cup-shaped portion for the removal of grain therefrom.

9. In combination with a grain elevating auger, a hopper comprising a cup-shaped member having a closed bottom end and an open upper end, flange means projecting laterally from the upper end, a flexible apron having an opening therein of the same size, and registering with, the open upper end of said cup-shaped member so as to cause a marginal portion of said apron to overlie said flange means, and means anchoring the overlying marginal portion of said apron to said flange means, the lower end of said auger being disposed in said cup-shaped member.

10. In combination, a cup-shaped member having a recessed bottom and an open upper end, said open end having an integral peripheral flange extending laterally outwardly therefrom and formed with a series of holes at spaced locations thereabout, a sheet of flexible material having an opening therethrough and having marginal portions of said material adjacent said opening reversely folded so as to overlie said flange and to make said opening the same size as the open end of said cup-shaped member, stitching forming a seam anchoring the free edge of said reversely folded marginal portions to the flexible sheet material confronting same, a collar member having a series of holes in said flange, a plurality of fastening elements extending through the holes of said collar, through said reversely folded marginal portions and the sheet material confronting same, and into the holes in said flange for retaining the opening in said sheet material in registry with the open end of said cup-shaped member, and a grain elevating auger having its entrance portion disposed in said cup adjacent the bottom thereof.

11. In combination, a member having a recessed bottom and open upper end, said open end having a peripheral open end having a peripheral flange projecting horizontally therefrom and formed with a series of holes at spaced locations thereabout, a sheet of flexible material having an opening therethrough of the same size as said open end so as to provide a marginal sheet portion overlying said peripheral flange, a collar member having a series of holes registrable with said series of holes in said flange and provided with a plurality of downwardly projecting teeth for engaging said flexible material, a plurality of fastening elements extending through the holes of said collar, through said marginal sheet portion and into the holes in said flange for retaining the opening in said sheet material in registry with the open end of said recessed member, and a grain elevating auger having its entrance portion disposed in said member adjacent the bottom thereof.

12. A hopper for a grain elevating auger comprising a cup-shaped member having a closed bottom end and an open upper end, said cup-shaped member having an oblong configuration when viewed from above and the dimensions of said oblong configuration being approximately eight by eighteen inches, flange means projecting laterally from the upper end, a flexible apron having an opening therein of the same size, and registering with, the open upper end of said cup-shaped member so as to cause a marginal portion of said apron to overlie said flange means, and means anchoring the overlying marginal portion of said apron to said flange means.

References Cited in the file of this patent

UNITED STATES PATENTS

| | | |
|---|---|---|
| 170,056 | Coe | Nov. 16, 1875 |
| 412,688 | Williams | Oct. 8, 1889 |
| 624,757 | Crumb | May 9, 1899 |
| 1,230,700 | Gledhill | June 19, 1917 |
| 1,531,440 | Hoyt | Mar. 31, 1925 |
| 1,819,912 | Magaffey | Aug. 18, 1931 |
| 2,105,225 | Pollock | Jan. 11, 1938 |
| 2,337,010 | Wiggins | Dec. 14, 1943 |
| 2,370,799 | Kelley | Mar. 6, 1945 |
| 2,390,286 | Adams | Dec. 4, 1945 |
| 2,425,681 | Lewis et al. | Aug. 12, 1947 |
| 2,785,825 | Wiggins | Mar. 19, 1957 |

FOREIGN PATENTS

| | | |
|---|---|---|
| 141,180 | Switzerland | Oct. 1, 1930 |
| 141,741 | Austria | May 10, 1935 |